(12) United States Patent
Wexler et al.

(10) Patent No.: US 10,956,659 B1
(45) Date of Patent: Mar. 23, 2021

(54) SYSTEM FOR GENERATING TEMPLATES FROM WEBPAGES

(71) Applicant: AMAZON TECHNOLOGIES, INC., Seattle, WA (US)

(72) Inventors: Michael Carey Wexler, Mountain View, CA (US); Erik Anders Karulf, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/707,457

(22) Filed: Dec. 9, 2019

(51) Int. Cl.
*G06F 40/143* (2020.01)
*G06F 40/284* (2020.01)
*G06F 40/186* (2020.01)
*G06F 16/958* (2019.01)

(52) U.S. Cl.
CPC .......... *G06F 40/143* (2020.01); *G06F 16/986* (2019.01); *G06F 40/186* (2020.01); *G06F 40/284* (2020.01)

(58) Field of Classification Search
CPC ...................................................... G06F 40/186
See application file for complete search history.

(56) References Cited

U.S. PATENT DOCUMENTS

| | | | |
|---|---|---|---|
| 6,298,357 B1 | 10/2001 | Wexler et al. | |
| 2011/0276874 A1* | 11/2011 | Dejean | G06F 40/186 715/243 |
| 2012/0291007 A1* | 11/2012 | Bagheri | G06Q 10/10 717/106 |
| 2016/0335243 A1* | 11/2016 | Zhai | G06F 16/2228 |
| 2017/0220544 A1* | 8/2017 | Masson | G06F 40/186 |
| 2017/0220545 A1* | 8/2017 | Gururajan | G06F 3/0482 |

OTHER PUBLICATIONS

HTML.Parser, "html.parser—Simple HTML and XHTML parser", 8 pages. Retrieved from the Internet on Oct. 11, 2019: https://docs.python.org/3/library/html.parser.html.
HTML-Differ, "html-differ—Code Browser", 1 Page. Retrieved from the Internet on Oct. 11, 2019: https://code.amazon.com/packages/html-differ/logs.

(Continued)

*Primary Examiner* — Asher D Kells
(74) *Attorney, Agent, or Firm* — Lindauer Law, PLLC

(57) ABSTRACT

Multiple webpages are used to generate a template that includes portions of webpage code or other instructions common to the webpages, and a view model for each webpage that indicates instructions that may be added to the template to reconstruct the webpage. A first webpage and a second webpage are analyzed to generate a first set of tokens that represent instructions for the first webpage and a second set of tokens that represent instructions for the second webpage. The sets of tokens are compared to determine matching and differing instructions between the webpages. A template is generated that includes the matching portions of instructions and placeholders at locations associated with differences. A view model for each webpage is generated that includes a value for each placeholder, the value being the instructions that may be added to the template at the location of the placeholder to reconstruct the webpage.

20 Claims, 6 Drawing Sheets

(56) References Cited

OTHER PUBLICATIONS

Sequencematcher, "SequenceMatcher—difflib—Python documentation—Kite". 2 pages. Retrieved from the Internet on Oct. 11, 2019: https://kite.com/python/docs/difflib.SequenceMatcher.
SlimIt, "SlimIt—JavaScript minifier", 13 pages. Retrieved from the Internet on Oct. 11, 2019: https://pypi.org/project/slimit/.
Tinycss2 "tinycss2—tinycss2 1.0.2 documentation—Read the Docs", 23 pgs. Retrieved from the Internet on Oct. 11, 2019: URL: https://tinycss2 readthedocs.io/en/latest/.

* cited by examiner

SYSTEM FOR GENERATING TEMPLATES FROM WEBPAGES

BACKGROUND

Webpages and other types of documents may be generated using a large amount of code or other types of instructions, and in some cases using multiple programming languages. As a result, creating a new webpage for a website or modifying an existing webpage may require extensive familiarity with existing code and in some cases, the generation of a significant amount of new code.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
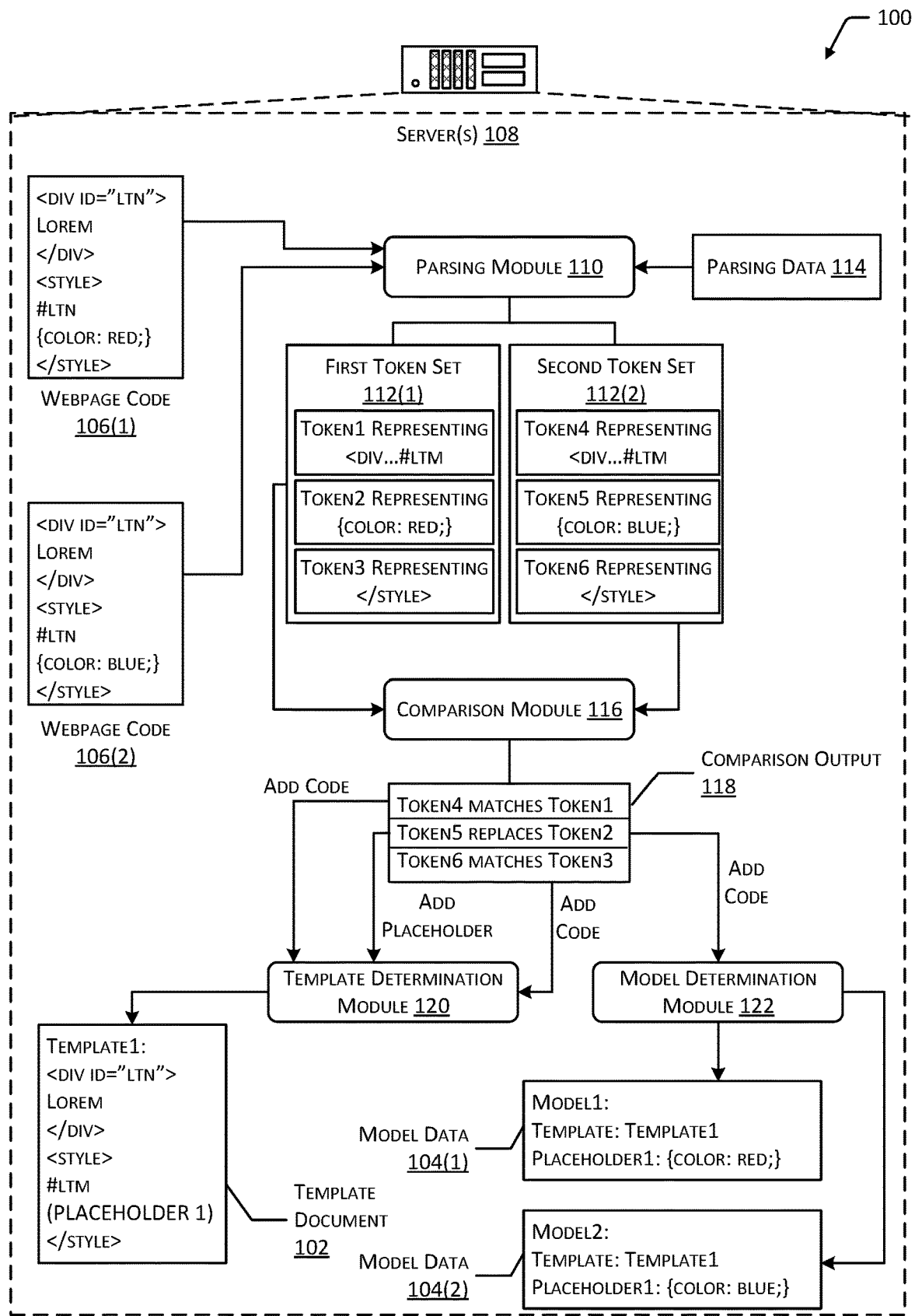
FIG. 1 depicts an implementation of a system for determining a template document and model data for generating view models based on the webpage code for multiple webpages.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A website or other collection of documents or user interfaces may include multiple webpages, or other types of documents. For example, a webpage may include instructions, such as webpage code, that may be used to cause a computing device to generate and present the webpage. Webpage code may include instructions in various programming languages, such as hypertext markup language (HTML), extensible markup language (XML), JavaScript (such as versions of JavaScript that conform to ECMA-262 standards, versions promulgated by Mozilla, and so forth), Visual Basic (such as versions promulgated by Microsoft), cascading style sheets (CSS), Extensible Style Sheet (XSL), and so forth. For example, a webpage may include a document that primarily includes HTML code, but one or more JavaScript elements may be embedded in the HTML code and may be denoted through use of tags or links that indicate the JavaScript element. In many cases, multiple webpages within a website may include code that is common to other webpages. For example, a webpage may include HTML code associated with the entire webpage, a header, a footer, or a body, the body may be divided into left, middle, and right columns, each column may include multiple components which may include subcomponents, and so forth. Multiple webpages within a website may share common elements in the header or footer. As another example, multiple webpages used for a similar purpose may include similar structural elements, such as the placement of columns, text boxes, image boxes, and so forth, while particular text, images, or other content may vary between the webpages. A single webpage may include a large amount of code. As such, modifying an existing webpage or creating a new webpage for a website may require extensive familiarity with the code associated with various webpages and in some cases, may require generation of a large quantity of new code.

Described in this disclosure are techniques for generating templates based on the instructions that are common to multiple webpages, and model data for generation of view models for the webpages. Generation of a template or series of templates that includes instructions common to multiple webpages, and model data that includes portions of webpage code that are not common to the multiple webpages, may reduce the complexity associated with modifying a webpage or generating a new webpage. For example, a webpage may be conceptually simplified from a large document that includes thousands of lines of code to one or more templates, in which each template includes portions of code that are common between the webpages, and model data for each webpage that represents the differences between the webpage and other similar webpages. Reducing a webpage to one or more templates and a set of differences between the template(s) and the webpage may facilitate modifications to the webpage and may also simplify the act of generating a new webpage using existing templates and existing model data for a similar webpage. Additionally, identifying portions of webpage code that are common to multiple webpages may enable this data to be stored, such as in a cache, and used to generate responses to subsequent requests, reducing the amount of data that must be generated or transmitted when a request is received.

To generate a template and model data, multiple webpages may be selected for comparison via user input or an automated process. For example, a first webpage and a second webpage in a website may each include HTML instructions and in some cases, content in other programming languages such as JavaScript or CSS. The first webpage may be analyzed, such as through use of a parsing tool, to generate a first set of lexical tokens based on the HTML instructions or other code associated with the first webpage. One example parsing tool may include the Simple HTML and XHTML parser, described at The Python Standard Library as promulgated by The Python Software Foundation. Another example parsing tool may include SlimIt, for parsing of JavaScript content, promulgated by the Python Packaging Authority. An example parsing tool for parsing of CSS content may include tinycss2, promulgated by the Python Packaging Authority. A parser may function by converting an input stream, such as a text string represented by the HTML instructions of the first webpage, into a stream of lexical tokens. A token may represent one or a sequence of characters having a common property or that match a predefined pattern. For example, each lexical token may include a token identifier and may include a reference to particular code or particular locations within the HTML instructions of the first webpage. As such, each lexical token of the first set may represent a respective portion of the code associated with the first webpage. The second webpage may also be analyzed to generate a second set of lexical tokens based on the HTML instructions or other code associated with the second webpage. In cases where a webpage includes multiple programming languages, when a tag, link, or other element indicating a second programming language is determined, a different parsing tool associated with the second programming language may be used. In some implementations, if different lexical tokens represent code associated with different programming languages, a lexical token may include an indication of the programming language associated with the represented code.

The first set and second set of lexical tokens may be compared to determine commonalities and differences between the instructions included in the first webpage and second webpage. For example, if a portion of the first set of lexical tokens that represents a first portion of the HTML instructions for the first webpage is identical to a portion of the second set of lexical tokens, this may indicate that the HTML instructions for the second webpage represented by the portion of the second set is identical to the corresponding HTML instructions for the first webpage. Similarly, comparing the sets of lexical tokens may determine locations in the first webpage having instructions for which no content is present in the second webpage (e.g., a removal), locations in the second webpage having instructions for which no content is present in the first webpage (e.g., an addition), or locations in the first webpage having instructions that differ from the instructions present at the same location in the second webpage (e.g., a replacement). Comparison of the lexical tokens rather than comparing the HTML instructions for each webpage directly may result in a more efficient comparison process that produces a more comprehensible output. For example, comparing thousands of lines of HTML code between two webpages may require a significant amount of time and computational resources and may result in generation of a lengthy and complex output that may not facilitate the comprehension of a user. Additionally, comparison of lexical tokens may enable a granular comparison of the instructions associated with webpages or other documents, rather than a line-by-line comparison of HTML code. For example, comparison of HTML instructions is typically performed using a line-by-line comparison, and the comparison process may remove line breaks, spaces, and other formatting characteristics. In contrast, a comparison of sets of lexical tokens that indicate portions of the original HTML instructions may enable a difference, such as a single term within a line of webpage code, to be identified while the remainder of the line of code is common to multiple webpages, and may enable line breaks, spaces, and other formatting characteristics to be retained when generating templates and model data. One example tool for comparing sets of lexical tokens may include SequenceMatcher, from Kite of San Francisco, Calif.

The portions of the first and second sets of lexical tokens that represent identical and different portions of the HTML instructions for the webpages may be used to generate one or more template documents and model data for the webpages. Specifically, the template document(s) may include the HTML instructions represented by the matching tokens from the first set and second set. For example, a token may include a reference to a location within the HTML instructions for a webpage, and generating the template document may include determining the represented instructions and adding the instructions to the template document. In some implementations, the original webpage or other document may be stored after generating the tokens, such as to preserve formatting and other characteristics of the instructions. For example, by referencing a location within the original webpage or document or the instructions for the webpage or document using the token, the instructions from the original document including formatting and other characteristics may be accessed and incorporated into the template document. In some cases, a webpage or other document may be conceptually divided into multiple sections or sub-documents, and a template and one or more sets of model data may be generated for each section. As such, a group of templates and associated model data may be used to reconstruct the entire website or other type of document. At locations in the template document(s) where the first and second webpages differ, such as locations where one webpage includes instructions not included in the other webpages, or where the two webpages include different instructions at the same location, a placeholder may be included in the template document(s).

Model data for each webpage may be generated and used at a subsequent time to generate a view model for the webpage. In some cases, a view model may receive user interactions to enable properties and commands associated with the view model to be tested. Specifically, first model data for the first webpage may include an indication of the template document(s) that were generated based on the webpage code and may associate an indication of each placeholder in the template document(s) with a corresponding value. For example, for each placeholder where the first webpage includes code or other instructions at a location that corresponds to the location of the placeholder, the model data may include a value representing the code or instructions at that location in the webpage. For each placeholder where the first webpage does not include code or other instructions, the first model data may include a null value, an indication of a lack of code or instructions at that location, or may not include a reference to the placeholder. Based on the first model data and the template document(s), the first webpage may be reconstructed, such as to generate a view model. For example, based on the first model data including an indication of a template document, the template document may be accessed. Then, at each location in the template document where a placeholder is included, the value (e.g., the code or other instructions) associated with that placeholder in the first model data may be added to the template document. The resulting document may then include all of the code associated with the first webpage. In a similar manner, second model data may be generated for the second webpage and used to reconstruct the second webpage. To modify one of the webpages, portions of the model data for that webpage that correspond to data that may be inserted at the position of a placeholder may be changed. To create a new webpage, one or more template documents may be used, while new model data for the new webpage may be generated, in some cases based on existing model data for an existing webpage. Additionally, when the first webpage or second webpage is accessed at a subsequent time, data associated with the template document(s) may be stored, such as in a cache, and used to generate a response without requiring the data in the template document(s) to be generated or transmitted from a web server or other source.

As one skilled in the art will appreciate in light of this disclosure, certain embodiments may be capable of achieving certain advantages. For example, generation of template documents based on multiple webpages and model data for a particular webpage may significantly reduce the complexity associated with modifying a webpage or generating a new webpage. Reducing a webpage to one or more template documents and differences between the template document(s) and the webpage may facilitate user comprehension of the webpage and of other similar webpages associated with a website. Determining portions of webpage code that are common to multiple webpages and storing this information in a template document may enable this data to be cached and used to generate responses to subsequent requests, even when the requests reference different webpages, reducing the amount of data that is generated or transmitted in response to a request. For example, if a template document is generated, the instructions stored in the template document may be used to generate a response when a request for any webpage associated with the template document is received.

FIG. 1 depicts an implementation of a system 100 for determining a template document 102 and model data 104 for generating view models based on the webpage code 106 for multiple webpages. While FIG. 1 illustrates use of webpage code 106 for two webpages to generate a single template document 102 and model data 104 for both webpages, in other implementations, instructions for generating any type of document or user interface may be used to generate any number of template documents 102 and model data 104. One or more servers 108 may store the webpage code 106 and various modules and data used to process the webpage code 106 to generate the template document 102 and model data 104. While FIG. 1 depicts a single server 108, any number and any type of computing devices may be used within the present disclosure. For example, a first computing device may provide the webpage code 106 to the server(s) 108, which may generate and provide the template document 102 and model data 104 to the first computing device. As another example, the server(s) 108 may store the webpage code 106, and user input from a separate computing device may be received by the server(s) 108, the user input indicating particular webpages or webpage code 106 for which generation of a template document 102 and model data 104 is requested.

In some implementations, the webpage code 106 may include HTML instructions, and in some cases may include instructions in one or more other programming languages such as JavaScript or CSS, that may be executed by a browser or another type of application to cause the associated webpage to be presented. For example, FIG. 1 depicts first webpage code 106(1) "<div id="ltn"> Lorem </div><style> #ltn {color: red;} </style>" associated with a first webpage. FIG. 1 also depicts second webpage code 106(2) "<div id="ltn"> Lorem </div><style> #ltn {color: blue;}</style>" associated with a second webpage. A parsing module 110 associated with the sever(s) 108 may access the first webpage code 106(1) and generate a first token set 112(1) based on the first webpage code 106(1). The first token set 112(1) may include one or more lexical tokens, each of which represents a portion of the first webpage code 106(1). The parsing module 110 may also generate a second token set 112(2) based on the second webpage code 106(2) and the parsing data 114. A first token set 112(1) that represents the webpage code 106(1) shown in FIG. 1 is shown in Token Example 1 below. A second token set 112(2) that represents the webpage code 106(2) shown in FIG. 1 is shown in Token Example 2 below.

[
('startTag', 'div', "[('id', '"ltn"')]"),
('data', 'Lorem'),
('endTag', 'div'),
('startTag', 'style', "[('src', 'assets/1.css')]"),
('css', 'qualified-rule'),
('css', 'hash', 'ltn'),
('css', 'whitespace', ' '),
('css', 'ident', 'color'),
('css', 'literal', ':'),
('css', 'whitespace', ' '),
('css', 'ident',
('css', 'literal', ';'),
('endTag', 'style'),
('end')
]

Token Example 1

[
('startTag', 'div', "[('id', '"ltn"')]"),
('data', 'Lorem'),
('endTag', 'div'),
('startTag', 'style', "[('src', 'assets/1.css')]"),
('css', 'qualified-rule'),
('css', 'hash', 'ltn'),
('css', 'whitespace', ' '),
('css', 'ident', 'color'),
('css', 'literal', ':'),
('css', 'whitespace', ' '),
('css', 'ident',
('css', 'literal', ';'),
('endTag', 'style'),
('end')
]

Token Example 2

In some implementations, the parsing module 110 may include one or more parsing tools that convert an input stream, such as text represented by the HTML instructions or other content within the webpage code 106(1), into lexical tokens based on one or more rules or algorithms indicated in parsing data 114. For example, the parsing data 114 may enable the parsing module 110 to determine particular HTML tags, comments, and other markup elements. In some cases, the parsing data 114 may enable the parsing module 110 to identify tags that indicate different programming languages. For example, the parsing module 110 may include different parsing tools for generating tokens based on code or other instructions for a webpage that incorporate different programming languages. FIG. 1 depicts the first token set 112(1) including three example tokens or groups of tokens, each of which represents a respective portion of the first webpage code 106(1). In some implementations, a token may include a token identifier and a reference to one or more locations within the webpage code 106(1) or associated webpage. For example, based on a reference to a particular location within the first webpage code 106(1), the portion of the webpage code 106(1) represented by a token may be accessed and retrieved, such as for generation of a template document 102 or model data 104. The parsing module 110 may also generate a second token set 112(2) based on the second webpage code 106(2) and the parsing data 114. FIG. 1 also depicts the second token set 112(2) including three example tokens or groups of tokens that each represent a respective portion of the second webpage code 106(2).

A comparison module 116 associated with the server(s) 108 may compare the first token set 112(1) and second token set 112(2) and generate a comparison output 118 indicative of identical or differing portions of the token sets 112. For example, if a token in the first token set 112(1) matches a token in the second token set 112(2), this may indicate that the portion of the webpage code 106(1) represented by the token of the first token set 112(1) matches the portion of the webpage code 106(2) represented by the token of the second token set 112(2). In such a case, the comparison output 118 may indicate the matching tokens. When matching tokens are determined, a template determination module 120 associated with the server(s) 108 may access the webpage code 106 represented by the matching tokens and add the matching code to the template document 102. If the first token set 112(1) includes a token representing webpage code 106(1) not represented in the second token set 112(2), the comparison output 118 may indicate a removal in the second token set 112(2) relative to the first token set 112(1). If the second token set 112(2) includes a token representing webpage code 106(2) not represented in the first token set 112(1), the comparison output 118 may indicate an addition in the second token set 112(2) relative to the first token set 112(1). If a token in the first token set 112(1) represents different webpage code 106(1) than a token in a corresponding location of the second token set 112(2), the comparison output 118 may indicate a replacement or substitution in the second token set 112(2) relative to the first token set 112(1). When a difference between the token sets 112 is determined, the template determination module 120 may add an indication of a placeholder to the template document 102 at a location associated with the webpage code 106 represented by the differing tokens. Additionally, a model determination module 122 associated with the server(s) 108 may add the differing portions of webpage code 106 to respective sets of model data 104 for each webpage, as described below. For example, FIG. 1 illustrates a case in which the first token set 112(1) includes three tokens or groups of tokens (Token1, Token2, and Token3) and the second token set 112(2) includes three tokens or groups of tokens (Token4, Token5, and Token6). Token1 and Token4 represent matching portions of the first webpage code 106(1) and the second webpage code 106(2), respectively. Token3 and Token6 also represent matching portions of the first webpage code 106(1) and the second webpage code 106(2), respectively. Token2 and Token5 represent portions of the first webpage code 106(1) and the second webpage code 106(2), respectively, that differ from one another but occupy corresponding locations. As a result, the comparison output 118 indicates that Token4 matches Token1, Token5 replaces Token2, and Token6 matches Token3, when comparing the second token set 112(2) to the first token set 112(1).

Based on the token sets 112, the webpage code 106 represented by the token sets 112, and the comparison output 118, the template document 102 and the model data 104 for each webpage may be generated. As described previously, the template determination module 120 may generate the template document 102 by determining the webpage code 106 represented by matching tokens indicated in the comparison output 118. For example, in response to the indication in the comparison output 118 that Token4 matches Token1, the template determination module 120 may determine the location in the first webpage code 106(1) indicated by Token1 and include the represented portion of the first webpage code 106(1) in the template document 102. In response to the indication in the comparison output 118 that Token5 replaces Token2, the template determination module 120 may include a placeholder in the template document 102 at a location that corresponds to the portion of the first webpage code 106(1) represented by Token2. In response to the indication in the comparison output 118 that Token3 matches Token6, the template determination module 120 may determine the location in the first webpage code 106(1) indicated by Token3 and include the represented portion of the first webpage code 106(1) in the template document 102. As a result, the template document 102 may include portions of the first webpage code 106(1) and second webpage code 106(2) that are common to both webpages, and may include a placeholder at a location where the first webpage code 106(1) differs from the second webpage code 106(2).

The model determination module 122 may generate first model data 104(1) based on the first webpage code 106(1), the first token set 112(1), and the comparison output 118, and second model data 104(2) based on the second webpage code 106(2), the second token set 112(2), and the comparison output 118. Model data 104 may be used, in combination with the template document 102, to generate the webpage associated with the webpage code 106. In some implementations, the model determination module 122 may include an indication of the template document 102 in the model data 104(1) for the first webpage code 106(1), in response to generation of the template document 102 based in part on the first webpage code 106(1). In other implementations, a separate document, such as a user interface described with regard to FIGS. 4 and 5 may be used to determine the template document 102 that is associated with the model data 104(1). The model determination module 122 may determine a portion of the first webpage code 106(1) that corresponds to the location of the placeholder in the template document 102. An indication of the placeholder, such as an identifier of the placeholder, may be stored in the model data 104(1), in association with a value for the placeholder. In some implementations, the value stored in the model data 104(1) may include the portion of the webpage code 106(1) that corresponds to the location of the placeholder in the template document 102. In other implementations, the value may include a reference to a location of the portion of the first webpage code 106(1). To generate the webpage using the template document 102 and the first model data 104(1), the values for each placeholder indicated in the model data 104(1) may be inserted into the template document 102. For example, inserting the portion of the webpage code 106(1) indicated in the first model data 104(1) at the location of the placeholder in the template document 102 may result in the generation of the original webpage code 106(1). In a similar manner, the model data 104(2) for the second webpage may, in some implementations, include an indication of the template document 102. The second model data 104(2) may also include a portion of the second webpage code 106(2) that corresponds to the location of the placeholder in the template document 102, which may be stored in association with an indication of the placeholder. While FIG. 1 depicts an example in which the template document 102 includes a single placeholder, in other implementations, a template document 102 may include any number of placeholders, and the model data 104 for a webpage may include values for multiple placeholders.

Figure 2:
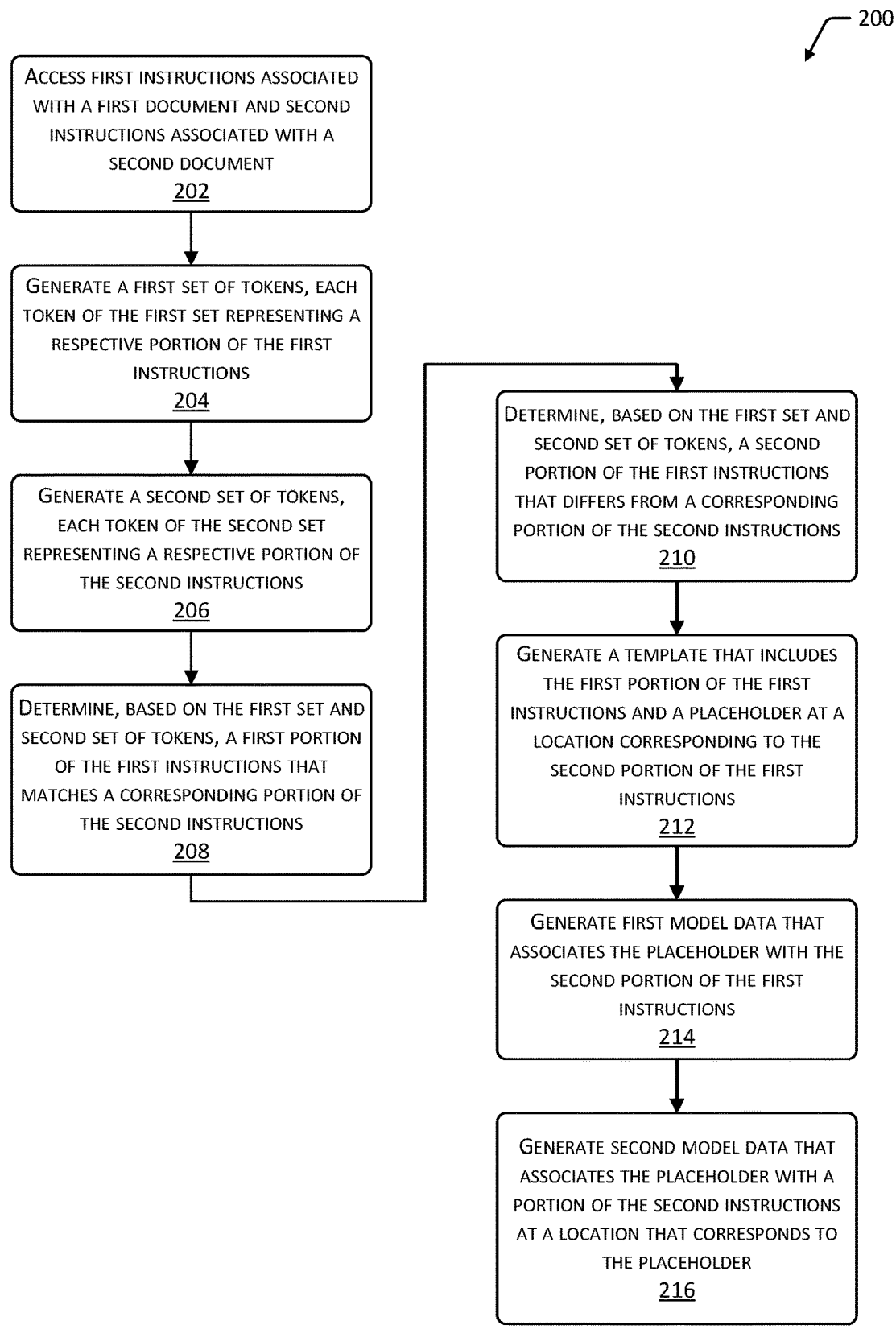
FIG. 2 is a flow diagram illustrating an implementation of a method for determining a template document and model data based on instructions associated with webpages or other types of documents.

FIG. 2 is a flow diagram 200 illustrating an implementation of a method for determining a template document 102 and model data 104 based on instructions associated with webpages or other types of documents. As described with regard to FIG. 1, instructions associated with a webpage, a document, or another type of interface may include webpage code 106 that may be processed, such as by a browser application executing on a computing device, to cause presentation of the webpage, document, or interface.

At 202, first instructions associated with a first document and second instructions associated with a second document may be accessed. In some implementations, user input may be received that selects or indicates particular documents. In other implementations, the first instructions and second instructions may be accessed automatically, such as by a computing device executing a process to generate template documents 102 and model data 104.

At 204, a first set of tokens may be generated, each token of the first set representing a respective portion of the first instructions. In some implementations, a token may reference a particular location in the first instructions. For example, by referencing a location in the first instructions rather than the represented portion of the first instructions, characteristics of the first instructions such as formatting, spacing, comments, and so forth may be retained. Continuing the example, when a token is used to generate a template document 102 or model data 104, the reference to a location in the first instructions may be used to determine the portion of the first instructions represented by the token so that the portion of the first instructions may be included in the template document 102 or model data 104.

In some implementations, generation of the first set of tokens may include use of one or multiple parsing tools. For example, the document may include a HTML file that is parsed using an HTML parser to generate the first set of tokens. In some implementations, other formats or programming languages may be embedded in a first programming language. For example, HTML may allow embedding of documents in other formats, such as JavaScript and CSS documents. As the first instructions are analyzed by a first parsing tool, such as an HTML parser, if a portion of the document is determined to be in another format, it may be parsed with a different parsing tool, such as a JavaScript parser to process embedded JavaScript or a CSS parser to process embedded CSS documents. For example, if a tag, link, or other element within the first instructions is determined to indicate a different programming language, use of a parsing tool associated with that programming language may be initiated. After processing the first instructions to generate the first set of tokens, the first set of tokens may include a sequence of tokens having the same order as the corresponding text in the first instructions.

At 206, a second set of tokens may be generated, each token of the second set representing a respective portion of the second instructions. In some implementations, the second set of tokens may be generated prior to or subsequent to generation of the first set of tokens. In other implementations, the second set of tokens may be generated at least partially concurrently with generation of the first set of tokens. Generation of the second set of tokens may include use of the same or different parsing tools, depending on the programming languages and other formats associated with the second instructions. After processing the second instructions to generate the second set of tokens, the second set of tokens may include a sequence of tokens having the same order as the corresponding text in the second instructions.

At 208, based on the first set and second set of tokens, a first portion of the first instructions that matches a corresponding portion of the second instructions may be determined. As described with regard to FIG. 1, the first set and second set of tokens may be compared, such as through use of a comparison tool. For example, because each set of tokens includes a sequence of tokens having the same order as the text in the corresponding instructions, each token of the sets may be compared with each other to determine identical and mismatched tokens. Tokens in the first set that match tokens in the second set may indicate that the associated portion of the first instructions matches a corresponding portion of the second instructions. Differences between the first set and second set may indicate that the first document includes instructions that are not present in the second document, the second document includes instructions that are not present in the first document, or that both documents include different instructions at a corresponding location.

For example, at 210, based on the first set and second set of tokens, a second portion of the first instructions that differs from a corresponding portion of the second instructions may be determined. Differences between the first set and second set of tokens may indicate an addition (e.g., the second instructions include content that is not present in the first instructions), a removal (e.g., the first instructions include content that is not present in the second instructions), or a replacement (e.g., the first instructions and second instructions include different content at corresponding locations). As described with regard to FIG. 1, a comparison output 118 may indicate the matching and differing tokens in the first set and second set.

At 212, a template may be generated that includes the first portion of the first instructions and a placeholder at a location corresponding to the second portion of the first instructions. For example, in response to a comparison output 118 or other type of determination that indicates matching tokens in the first set and second set, the first portion of the first instructions indicated in the matching tokens may be determined. When matching tokens for the first set and second set are determined, the instructions corresponding to the matching tokens may be added to the template. When differing tokens between the first set and second set are determined, a placeholder may be added to the template. As such, the first portion of the first instructions may be included in the template based on the matching tokens due to the matching tokens indicating that the first portion of the first instructions is also present in the second instructions. At locations that correspond to differing tokens, which represent different instructions associated with the document, a placeholder may be included in the template. While FIG. 2 describes a singular first portion of the first instructions and a singular placeholder for illustrative purposes, a template may include any number of placeholders and any number of matching portions of instructions. The template may then be used, in combination with additional instructions in place of the placeholder, to output the original document. For example, as described with regard to FIG. 1, model data 104 may indicate instructions to be used in place of one or more placeholders to reconstruct an original document using a template.

At 214, first model data 104(1) that associates the placeholder with the second portion of the first instructions may be generated. In some implementations, the first model data 104(1) may include an indication of the template. In other implementations, a user interface, such as the user interface described with regard to FIGS. 4 and 5, may be generated that associates the template with sets of model data 104. For example, the user interface may function as a layout diagram that indicates the templates and model data 104 that may be used to reconstruct a webpage or other type of document. Continuing the example, the first model data 104(1) may be used, in combination with the template, to generate a view model or other type of output that presents the first document or first instructions. The first model data 104(1) may include an indication of at least a subset of the placeholders included in the template. For each indicated placeholder, the first model data 104(1) may indicate a value, such as a portion of the first instructions, that may be inserted into the template in place of the placeholder to reconstruct the first instructions. For example, when differing tokens are determined and a placeholder is added to the template, the instructions associated with the differing tokens for the first document may be added to the first model data 104(1). In cases where the first instructions do not include content at the location of a placeholder, the first model data 104(1) may associate a null value with an indication of the placeholder. In other implementations, the first model data 104(1) may lack an indication of the placeholder if no value is associated with the placeholder or may include an indication that no instructions are present at the location associated with the placeholder.

At 216, second model data 104(2) that associates the placeholder with a portion of the second instructions at a location that corresponds to the placeholder may be generated. In some implementations, the second model data 104(2) may include an indication of the template. In other implementations, a separate document, such as the user interface described with regard to FIGS. 4 and 5, may associate the template with sets of model data 104. For example, the user interface may be generated concurrently with generation of the template and model data 104 or may be generated subsequent to generation of the template and model data 104. The second model data 104(2) may include an indication of at least a subset of the placeholders included in the template. For each indicated placeholder, the second model data 104(2) may indicate a value, such as a portion of the second instructions, that may be inserted into the template in place of the placeholder to reconstruct the second instructions. If the second instructions do not include content at the location of a placeholder, the second model data 104(2) may associate a null value with the placeholder, an indication that no instructions are present at the location of the placeholder, or may lack an indication of the placeholder. Generation of a template and two sets of model data 104 based on the first instructions and second instructions may simplify two complex documents, such as webpages that may include a large quantity of code, to a template document 102 and sets of differences between each webpage and the template document 102 that are represented by the model data 104 for each webpage.

Figure 3:
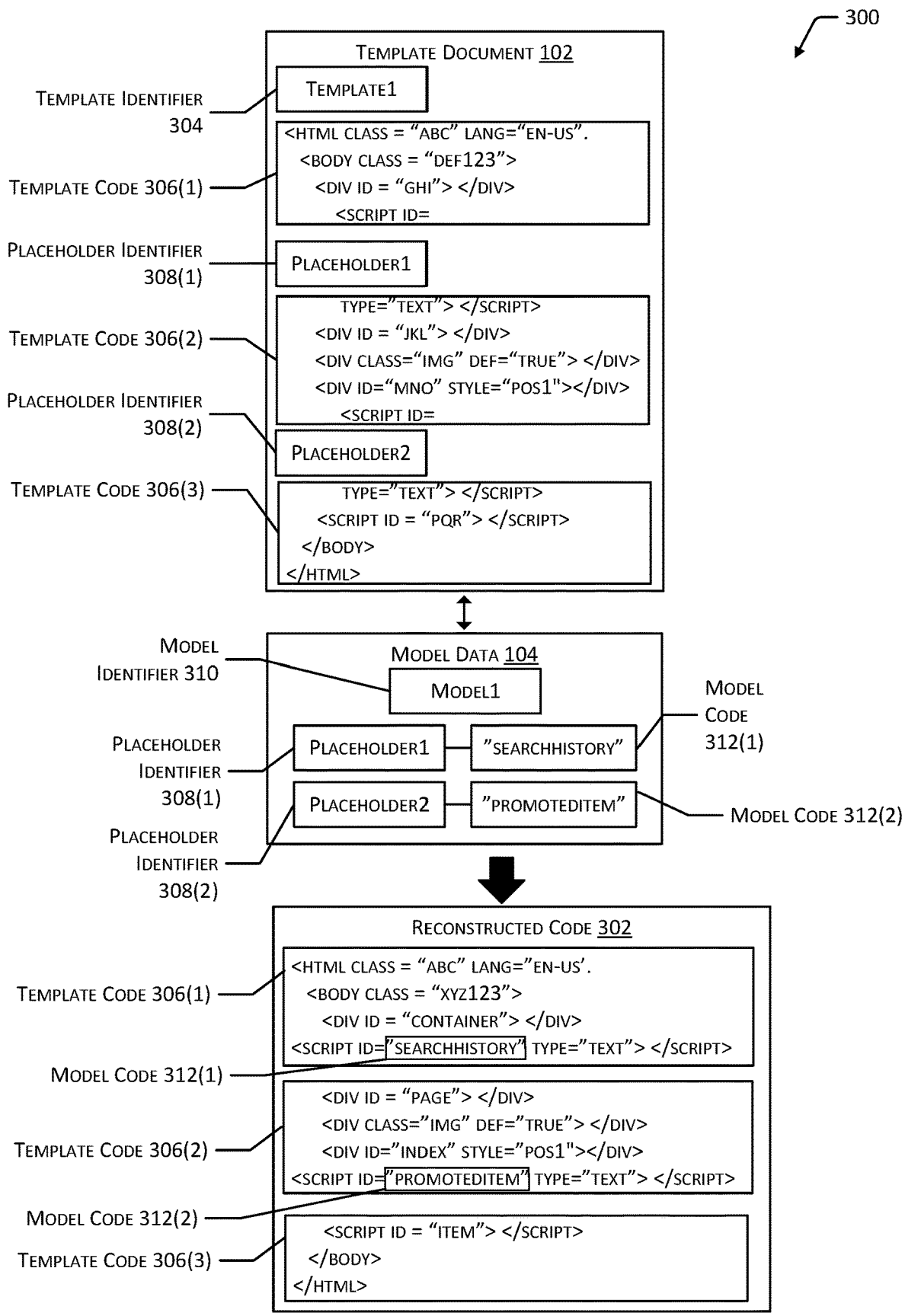
FIG. 3 is a series of block diagrams illustrating an example template document, model data, and reconstructed code that may be generated based on the template document and model data.

FIG. 3 is a series of block diagrams 300 illustrating an example template document 102, model data 104, and reconstructed code 302 that may be generated based on the template document 102 and model data 104. As described with regard to FIG. 1, a template document 102 may include portions of webpage code 106 or other instructions that are common to multiple webpages or other types of documents. For example, sets of lexical tokens may be generated based on the webpage code 106 for two webpages, and the sets of tokens may be compared to determine matching tokens that represent matching portions of webpage code 106, and tokens that differ, representing an insertion, deletion, or substitution of webpage code 106 for one webpage relative to another. The template document 102 may include the webpage code 106 or other instructions common to the two webpages, and may include a placeholder at locations where the webpage code 106 or other instructions differ between the two webpages. As described previously, in some cases, parsing webpage code 106 or other instructions to generate sets of lexical tokens may enable a granular comparison rather than a line-by-line comparison of webpage code 106. For example, a placeholder may be inserted at a location within the template document 102 that represents only a partial line of webpage code 106, such as a single term that may differ between multiple webpages. Additionally, comparison of lexical tokens may preserve line breaks, spacing, and other formatting characteristics of the webpage code 106 such that when a portion of the webpage code 106 is inserted into a template document 102 or into model data 104, the formatting characteristics of the inserted portion of the webpage code 106 may be retained.

Specifically, FIG. 3 depicts an example template document 102 that includes a template identifier 304. The template identifier 304 may include an alphanumeric string or any other type of alphanumeric data, audio data, image data, and so forth that may be used to differentiate a particular template document 102 from other template documents 102 or other data. For example, the template identifier 304 may include a name, an indication of the webpages or webpage code 106 that was used to generate the template document 102, and so forth. Portions of webpage code 106 that are common to multiple webpages may be included in the template document 102 as template code 306. FIG. 3 depicts the template document including first template code 306(1), second template code 306(2) subsequent to the first template code 306(1), and third template code 306(3) subsequent to the second template code 306(2). In some implementations, each section of template code 306 may correspond to a single matching token between the sets of tokens determined for two webpages or other documents. In other implementations, a section of template code 306 may correspond to webpage code 106 represented by multiple matching tokens. For example, sets of tokens for two webpages may be compared until a difference is determined. In such a case, multiple matching tokens may be determined before the difference is determined, and a section of template code 306 may include the webpage code 106 represented by each of the matching tokens.

Each section of template code 306 is shown separated by a placeholder identifier 308. For example, a first placeholder identifier 308(1) is shown between the first template code 306(1) and the second template code 306(2). A second placeholder identifier 308(2) is shown between the second template code 306(2) and the third template code 306(3). While FIG. 3 depicts a placeholder identifier 308 between each section of template code 306, in other implementations, two sections of template code 306 may be adjacent to one another without a placeholder identifier 308 therebetween. Similarly, two placeholder identifiers 308 may be adjacent to one another without template code 306 therebetween. As described with regard to FIGS. 1 and 2, when token sets 112 representing webpage code 106 for multiple webpages are compared, a placeholder identifier 308 may be included in the template document 102 at a location corresponding to the code or other instructions represented by differing tokens in the token sets 112. The resulting template document 102 may therefore include template code 306 that is identical to portions of the webpage code 106 that are common to multiple webpages, and a placeholder identifier 308 at each location where the webpage code 106 for the compared webpages differs. Each placeholder identifier 308 may include an alphanumeric string or other types of data including, without limitation, the types of data described with regard to the template identifier 304. For example, a placeholder identifier 308 may include a unique name or alphanumeric string that may differentiate a placeholder within a template document 102 from other placeholders. In some implementations, the placeholder identifier 308 may include data indicative of the template document 102 that includes the placeholder identifier 308, data indicative of one or more of the webpages associated with generation of the template document 102 or placeholder, and so forth.

As described with regard to FIGS. 1 and 2, model data 104 for each webpage or other type of document or interface may be generated in addition to the template document 102. The model data 104 may be generated prior to, subsequent to, or concurrent with generation of the template document 102. For example, model data 104 may be generated based on a comparison output 118, independent of the template document 102, model data 104 may be generated based on the template document 102 subsequent to generation of the template document 102, or model data 104 may be generated as the template document 102 is generated, such as by determining portions of webpage code 106 that correspond to placeholders as the placeholders are added to the template document 102. The model data 104 may include portions of webpage code 106 or other instructions that differ between the webpage and another webpage used to generate the template document 102. As such, the template document 102 in combination with the model data 104 may represent a list of similarities and differences, respectively, between the code associated with two webpages or other documents.

The model data 104 may include a model identifier 310, which may include an alphanumeric string or other type of data that may be used to differentiate the model data 104 from other data. For example, the model identifier 310 may include an indication of the webpage or other document from which the model data 104 was generated. The model identifier 310 may include any other type of data including, without limitation, the types of data described with regard to the template identifier 304. In some implementations, the model data 104 may also include an indication of the template identifier 304. For example, the model data 104 may reference a template identifier 304 for a template document 102 having placeholders into which instructions from the model data 104 may be added to generate the reconstructed code 302. In other implementations, the placeholder identifiers 308 may be used to associate the model data 104 with the template document 102, and an indication of the template identifier 304 may be omitted from the model data 104. In still other implementations, a separate document, such as the user interface described with regard to FIGS. 4 and 5, may be used to associate template documents 102 with sets of model data 104 that may be used for generation of webpages and other documents.

The model data 104 may associate one or more placeholder identifiers 308 with corresponding model code 312. For example, FIG. 3 depicts the model data 104 associating the first placeholder identifier 308(1) with first model code 312(1) and the second placeholder identifier 308(2) with second model code 312(2). The model code 312 may represent a portion of the webpage code 106 or other instructions that may be inserted into the template document 102 at a location corresponding to the associated placeholder to generate reconstructed code 302, which may be used to output the associated webpage. While FIG. 3 depicts both the first placeholder identifier 308(1) and second placeholder identifier 308(2) associated with respective model code 312, in other implementations, the model data 104 may associate a null value with one or more placeholder identifiers 308. For example, if the webpage code 106 for a webpage does not include code at a location corresponding to a placeholder, the model data 104 may associate a null value with the placeholder identifier 308 for the placeholder. In other implementations, the model data 104 may lack an indication of the placeholder if the webpage code 106 does not include code at the location corresponding to the placeholder.

As described previously, reconstructed code 302 that may be used to output the webpage, such as a view model, may be generated based on the template document 102 and model data 104. The reconstructed code 302 may be substantially identical to the original webpage code 106 associated with the webpage. For example, the reconstructed code 302 may be generated by accessing the template document 102, determining each placeholder identifier 308 indicated in the template document 102, and inserting the corresponding model code 312 for each placeholder identifier 308 into the template document 102 at the location of the placeholder identifier 308. In some implementations, a script may be executed to generate the reconstructed code 302 based on the template document 102 and model data 104.

Figure 4:
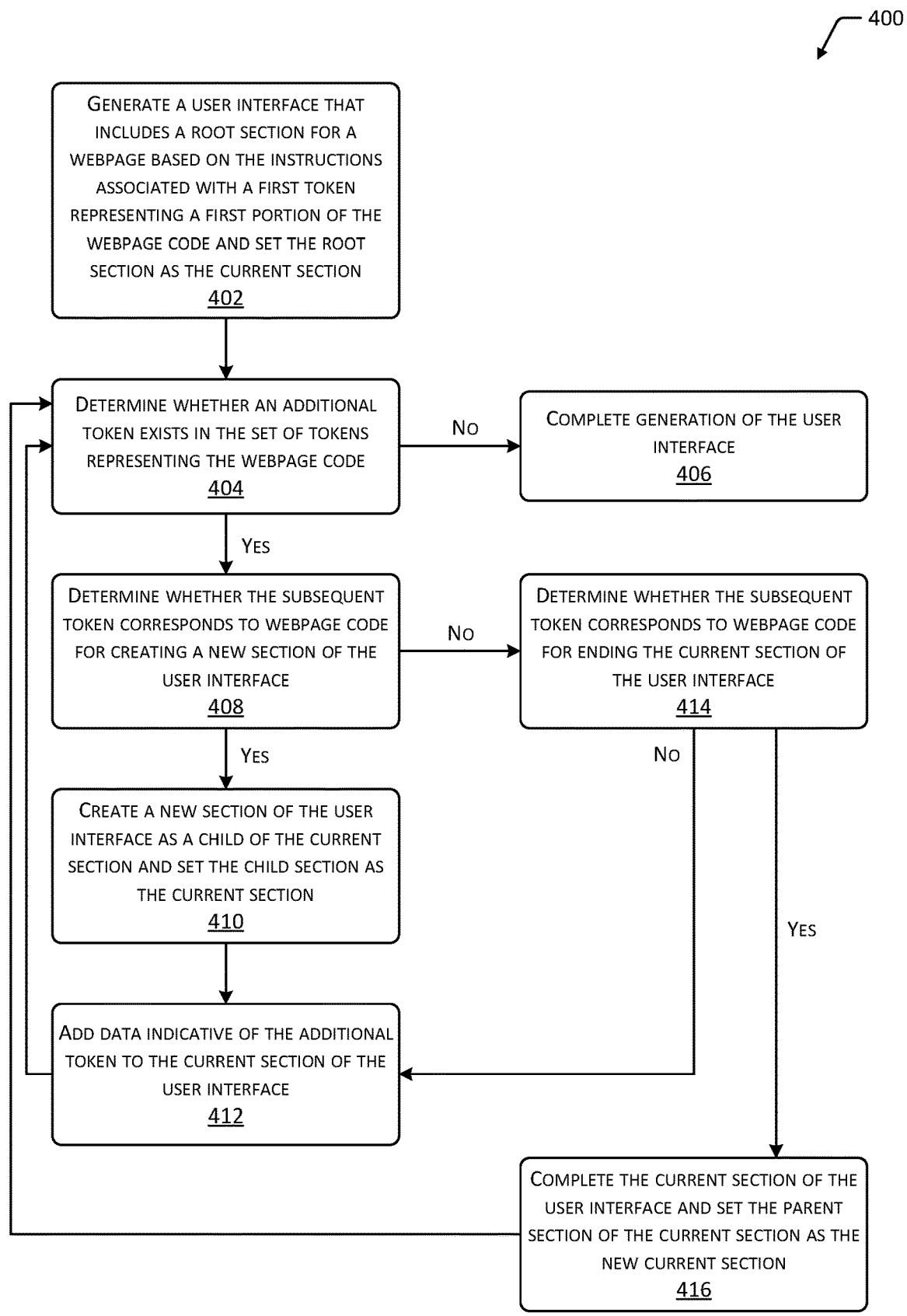
FIG. 4 is a flow diagram illustrating a method for generating a user interface that presents information regarding sections of a webpage and the templates and model data used to reconstruct the webpage.

FIG. 4 is a flow diagram 400 illustrating a method for generating a user interface that presents information regarding sections of a webpage and the templates and model data 104 that may be used to reconstruct the webpage. For example, a webpage or other type of document may be conceptually divided into sections based on the webpage code 106 or other content associated with each section of the webpage, and each section may be associated with a particular template document 102. Each section may also be associated with model data 104 for one or more webpages. For example, two webpages analyzed using the method described with regard to FIG. 2 may be used to generate a user interface presenting multiple sections. Each section may be associated with a single template document 102 and multiple sets of model data 104, with each model data 104 corresponding to one of the webpages used to generate the template document 102. As such, the user interface may be used to determine particular templates and model data 104 that may be used to reconstruct webpages or other documents, such as to generate a view model using a particular template document 102 and model data 104. The user interface may be generated concurrently with generation of the template document 102 and model data 104 or may be generated after generating one or more template documents 102 and sets of model data 104.

At 402, a user interface may be generated that includes a root section for a webpage or other document based on the instructions associated with a first token representing a first portion of webpage code 106. The root section may be set as a current section for performance of the method described with regard to FIG. 4. For example, the root section may present a name of the section, information indicative of a template document 102 used to generate the corresponding section of a webpage, information indicative of model data 104 for the webpages used to generate the template document 102, and so forth. Continuing the example, a template document 102 and model data 104 indicated in the root section of the user interface may be used to reconstruct a portion of the webpage corresponding to the root section of the user interface.

At 404, a determination may be made as to whether an additional token exists in the set of tokens representing the webpage code 106. For example, if no additional tokens exist, the method may proceed to 406, and generation of the user interface may be completed. However, if an additional token exists, the method may proceed to 408.

At 408, it may be determined whether the subsequent token corresponds to webpage code 106 for creating a new section of the user interface. For example, certain commands or other types of webpage code 106 may be selected, such as by a user, to be used to initiate new sections of the user interface. For example, a webpage that includes HTML code may use "div" commands to initiate new sections and "Idly" commands to end sections. As such, if it is determined that the webpage code 106 associated with a token corresponds to a new section, the method may proceed to 410. At 410, a new section of the user interface may be created as a child of the current section, and the newly-created child section may be set as the current section. Then, at 412, data indicative of the additional token may be added to the current section of the user interface. The method may then return to 404, where it may be determined whether an additional token exists.

However, if it is determined at 408 that the token does not correspond to webpage code 106 for creating a new section, the method may proceed to 414. At 414, it may be determined whether the token corresponds to webpage code 106 for ending the current section of the user interface. Certain commands or other types of webpage code 106 may be selected, such as by a user, to be used to end sections of the user interface, such as a "/div" command in HTML code. If the token does not correspond to webpage code 106 for ending the current section, the method may proceed to 412 and data indicative of the token may be added to the current section of the user interface. If the token does correspond to webpage code 106 for ending the current section, the method may proceed to 416. At 416, the current section of the user interface may be completed and the parent section of the current section may be set as the new current section for performance of the method. The method may then return to 404 for determining whether an additional token exists.

The generated user interface may function as a diagram that associates a template document 102 for each section of a webpage or other type of document with one or more sets of model data 104. As such, the user interface may be used to determine the particular template documents 102 and model data 104 that may be used to reconstruct a document, such as to generate a view model. In some implementations, the user interface may be generated concurrently with generation of the template document(s) 102 and model data 104. For example, as sets of tokens are compared and data is added to a template document 102 or to model data 104, the method of FIG. 4 may be concurrently performed and data may be added to the user interface. In other implementations, the user interface may be generated subsequent to generation of one or more template documents 102 and model data 104.

Figure 5:
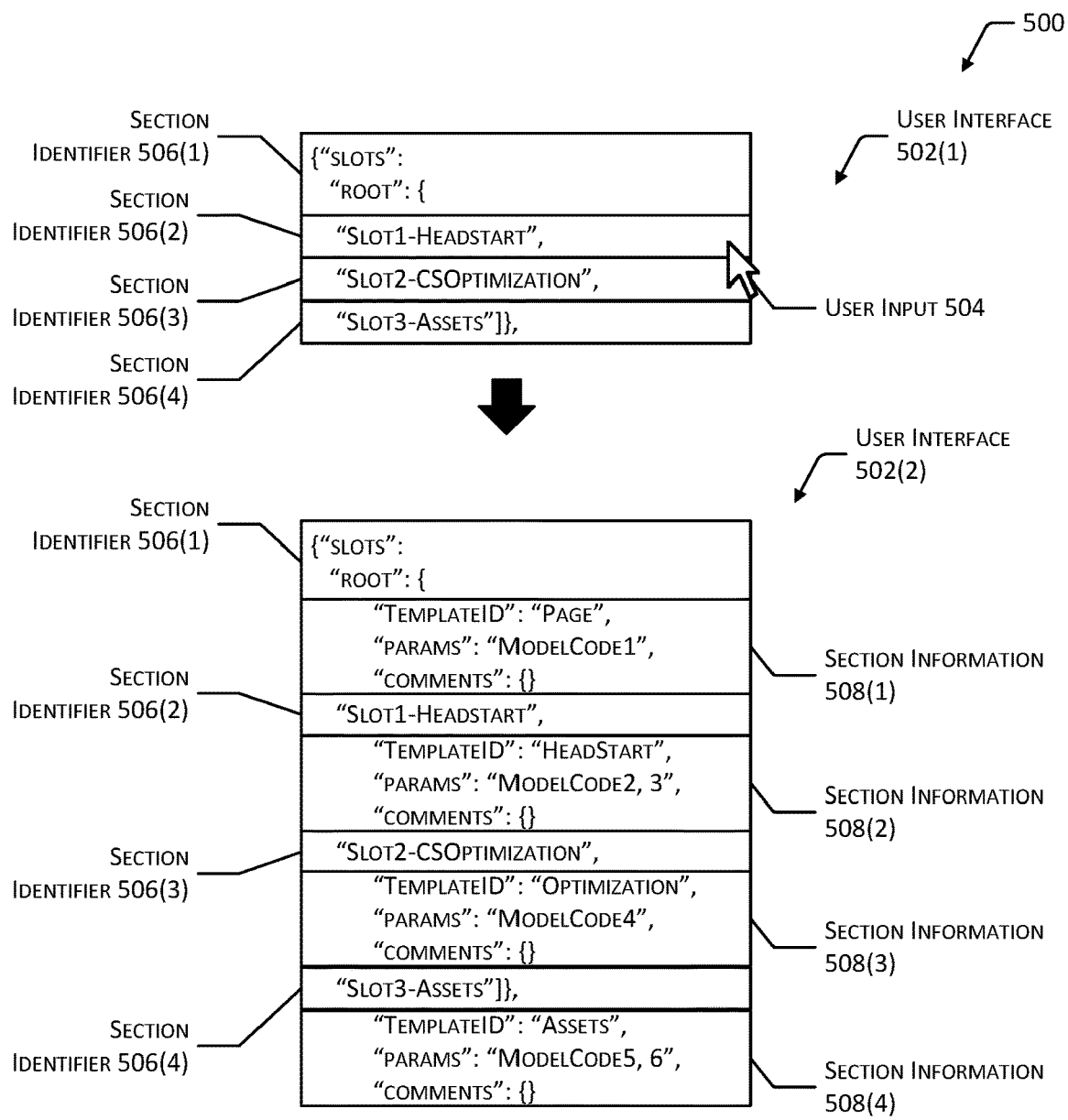
FIG. 5 depicts a block diagram illustrating an implementation of a user interface that presents information regarding template documents and model data associated with one or more sections of a webpage or other types of document.

FIG. 5 depicts a block diagram 500 illustrating an implementation of a user interface 502 that presents information regarding template documents 102 and model data 104 associated with one or more sections of a webpage or other types of document. For example, as described with regard to FIG. 4, concurrent with or after generation of one or more template documents 102 and model data 104 associated with a webpage, a user interface 502 that associates template documents 102 for one or more sections of a webpage with model data 104 may be generated. For example, FIG. 5 depicts the user interface 502(1) at a first time, prior to receipt of user input 504, presenting section identifiers 506 for one or more sections of a webpage represented by the user interface 502. The particular sections that are represented may be determined based on the webpage code 106 associated with particular tokens, as described with regard to FIG. 4. For example, the section identifiers 506 may be determined based on the HTML code or other instructions that are selected to initiate or end particular sections of the user interface 502. Continuing the example, the user interface 502 may be presented as a hierarchal tree structure based on the hierarchal structure of the HTML code associated with a webpage. FIG. 5 depicts the user interface 502(1) presenting a first section identifier 506(1), which may indicate one or more categories or subcategories. Subsequent to the first section identifier 506(1), a second section identifier 506(2), third section identifier 506(3), and fourth section identifier 506(4) are presented, indicating three sections or subsections that may follow the first section within the tree structure of the website.

In response to user input 504 selecting one or more of the section identifiers 506, section information 508 for the selected section identifier(s) 506 may be presented in the user interface 502(2). For example, FIG. 5 depicts the user interface 502(2) at a second time after receipt of user input 504 selecting each of the depicted section identifiers 506. In response to the user input 504, section information 508(1) for the first section identifier 506(1) may be presented. The section information 508(1) may be determined based in part on the template document 102 and model data 104 associated with webpage code 106 of the corresponding section. For example, the section information 508(1) associated with the first section identifier 506(1) may include an indication of the template document 102 associated with the section of the webpage, as well as corresponding model data 104 for each webpage used to generate the template document 102. In some cases, the section information 508(1) may indicate a portion of the model code 312 associated with the model data 104. In some implementations, the section information 508(1) may include comments, remarks, feedback, and so forth input by one or more users, such as information describing the particular webpage, view model, template, and so forth. In a similar manner, FIG. 5 depicts second section information 508(2) associated with the second section identifier 506(2), third section information 508(3) associated with the third section identifier 506(3), and fourth section information 508(4) associated with the fourth section identifier 506(4).

Figure 6:
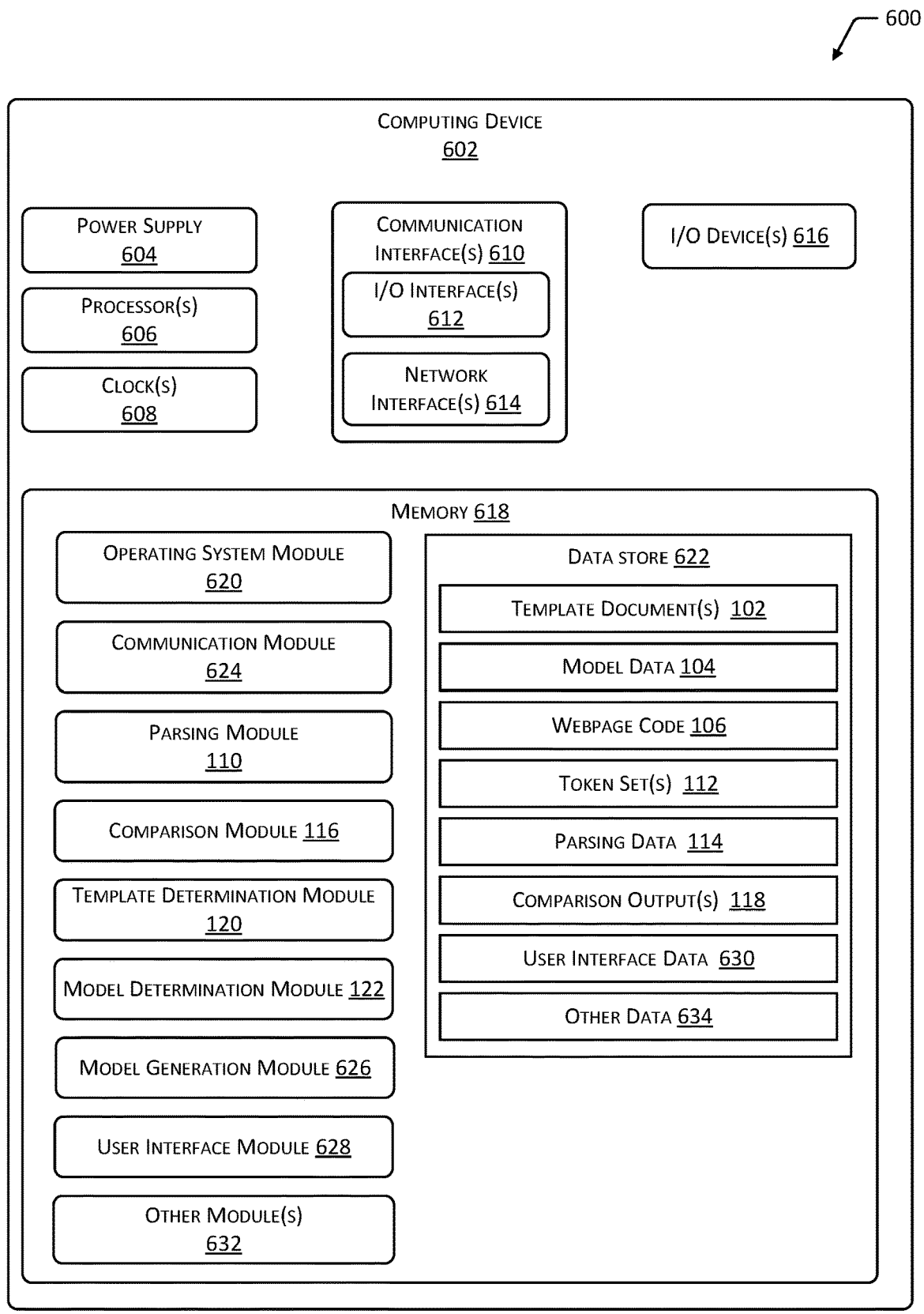
FIG. 6 is a block diagram illustrating an implementation of a computing device that may be used within the present disclosure.

FIG. 6 is a block diagram 600 illustrating an implementation of a computing device 602 that may be used within the present disclosure. The computing device 602 may include one or more servers 108, as shown in FIG. 1. In other implementations, other types of computing devices 602 may be used in addition to or in place of the servers 108. Additionally, while FIG. 6 depicts a single block diagram 600 of a computing device 602, any number and any type of computing devices 602 may be used to perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s)

606 may include one or more cores. One or more clock(s) 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, I/O devices 616 may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, 5G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the parsing module 110. The parsing module 110 may generate token sets 112 based on webpage code 106 or other types of instructions associated with webpages or other documents. For example, the parsing module 110 may include one or more parsing tools that convert an input stream, such as text represented by HTML instructions of a webpage, into lexical tokens, each token representing a respective portion of the instructions. The manner in which the tokens are associated with webpage code 106 or other instructions may be determined based at least in part on one or more rules or algorithms indicated in parsing data 114. For example, the parsing data 114 may enable the parsing module 110 to determine particular HTML tags, comments, and other markup elements. In some implementations, the parsing module 110 may include multiple parsing tools configured to generate tokens based on inputs in different programming languages. For example, the parsing data 114 may enable the parsing module 110 to identify tags that indicate different programming languages or content associated with different programming languages. After processing the instructions to generate a token set 112, the token set 112 may include a sequence of tokens having the same order as the corresponding text in the instructions.

The memory 618 may also include the comparison module 116. The comparison module 116 may compare token sets 112 generated based on different instructions, such as webpage code 106 for different webpages, to generate a comparison output 118 indicative of identical or differing portions of the token sets 112. For example, the comparison output 118 may indicate matching tokens or sets of tokens, which may in turn indicate that the instructions represented by the matching tokens are within a threshold level of similarity. The comparison output 118 may also indicate a removal if a first token set 112(1) includes one or more tokens not included in a second token set 112(2), an addition if a second token set 112(2) includes one or more tokens not included in a first token set 112(1), or a replacement if both the first and second token sets 112 include different tokens at corresponding locations. Comparison of the lexical tokens rather than comparing the HTML instructions for each webpage directly may result in a more efficient comparison process that produces a more comprehensible output, as well as a more granular process that may allow single terms or portions of a single line of code to be identified as common to multiple documents or different between the multiple documents.

The memory 618 may also include the template determination module 120. The template determination module 120 may generate a template document 102 for multiple webpages or other types of documents based on a comparison output 118, the token sets 112 for the webpages, and the webpage code 106 or other instructions for the webpages. Specifically, for matching tokens indicated in the comparison output 118, the template determination module 120 may determine the portion of the webpage code 106 associated with the matching tokens and include the portion of the webpage code 106 in the template document 102. For differences between token sets 112 indicated in the comparison output 118, the template determination module 120 may include a placeholder at each location associated with a difference. As described with regard to FIG. 3, each placeholder may be associated with a placeholder identifier 308.

The memory 618 may additionally include the model determination module 122. The model determination module 122 may generate model data 104 based on webpage code 106 or other instructions associated with webpages or other types of documents, a comparison output 118, and token sets 112 associated with webpages. The model data 104 may include a model identifier 310 or other indication of the webpage or document associated with the model data 104, a template identifier 304 indicative of the template document 102 associated with the webpage or document, and model code 312. Model code 312 may be associated with placeholder identifiers 308. For example, each placeholder identifier 308 in the model data 104 may be associated with model code 312 that includes code or other information that may be inserted in place of a placeholder in the template document 102 or generate reconstructed code 302 that may be used to cause output of the webpage or other document. To generate the model data 104, the model determination module 122 may determine a location of a placeholder in the template document 102 and a portion of webpage code 106 that corresponds to the location of the placeholder. An indication of the placeholder, such as a placeholder identifier 308, may be stored in the model data 104 in association with a value for the placeholder, such as model code 312. In some implementations, the value stored in the model data 104 may include the portion of the webpage code 106 that corresponds to the location of the placeholder in the template document 102. In other implementations, the value may include a reference to a location of the portion of the webpage code 106. In cases where the associated webpage code 106 does not include content in a location corresponding to the placeholder, the model data 104 may associate a null value with the placeholder identifier 308, an indication of a lack of data associated with the placeholder identifier 308, or may lack an indication of the placeholder.

The memory 618 may also include a model generation module 626. The model generation module 626 may be used to generate reconstructed code 302 based on model data 104 for a webpage or other document, which may be used to output the webpage or other document, such as by presenting a view model. For example, the model data 104 may include a template identifier 304 indicative of a template document 102. In response to the template identifier 304, the model generation module 626 may access the indicated template document 102 and determine one or more placeholder identifiers 308 included in the template document 102. The model generation module 626 may determine correspondence between the placeholder identifiers 308 of the template document 102 and the placeholder identifiers 308 of the model data 104. For each corresponding placeholder identifier 308 in the model data 104, the associated model code 312 may be inserted into the template document 102 at a location corresponding to the placeholder identifier 308. The resulting reconstructed code 302 may be identical to the original webpage code 106 or other instructions used to cause the webpage or other document to be presented.

The memory 618 may additionally include a user interface module 628. The user interface module 628 may generate one or more user interfaces 502 based on webpage code 106, template documents 102, and model data 104 associated with one or more webpages. For example, the user interface module 628 may access user interface data 630, which may include one or more arrangements or formats associated with generation of user interfaces 502, such as indications of particular commands, webpage code 106, or other types of instructions that may be used to initiate or end sections of the user interface 502. Continuing the example, the user interface data 630 may also indicate specific portions of webpage code 106, such as particular HTML commands or elements, in response to which a separation in the user interface 502 may be generated. For example, particular HTML elements indicated in the user interface data 630 may be included in a separate category or subcategory in the user interface 502 relative to a previous HTML element. As described with regard to FIG. 5, the user interface 502 may present template documents 102 for particular sections of a webpage, model data 104, and section information 508 indicative of associated template documents 102, model code 312, and so forth.

Other modules 632 may also be present in the memory 618. For example, other modules 632 may include modules for rendering or otherwise generating webpages, and for receiving user input selecting webpages for generation of template documents 102 and model data 104. Other modules 632 may also include encryption modules to encrypt and decrypt communications between computing devices 602, authentication modules to authenticate communications sent or received by computing devices 602, a permission module to assign, determine, and manage user permissions to access or modify data associated with computing devices 602, and so forth.

Other data 634 within the data store(s) 622 may include configurations, settings, preferences, and default values associated with computing devices 602. Other data 634 may also include encryption keys and schema, access credentials, and so forth. Other data 634 may also include network data indicative of networks accessible to one or more computing devices 602.

In different implementations, different computing devices 602 may have different capabilities or capacities. For example, particular servers 108 may have greater processing capabilities or data storage capacity than other servers 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
    one or more memories storing computer-executable instructions; and
    one or more hardware processors to execute the computer-executable instructions to:
        receive user input indicating a first webpage and a second webpage, wherein the first webpage includes first HyperText Markup Language (HTML) instructions and the second webpage includes second HTML instructions;
        generate a first set of first lexical tokens based on the first HTML instructions, wherein each first lexical token of the first set of first lexical tokens includes a first token identifier and a first reference to a respective portion of the first HTML instructions represented by the first lexical token;
        generate a second set of second lexical tokens based on the second HTML instructions, wherein each second lexical token of the second set of second lexical tokens includes a second token identifier and a second reference to a respective portion of the second HTML instructions represented by the second lexical token;
        compare the first set of first lexical tokens to the second set of second lexical tokens to determine:
            a first portion of the first set of first lexical tokens that represents a respective portion of the first HTML instructions that is identical to a respective portion of the second HTML instructions represented by a second portion of the second set of second lexical tokens; and
            a third portion of the first set of first lexical tokens that represents a respective portion of the first HTML instructions that differs from a respective portion of the second HTML instructions represented by a fourth portion of the second set of second lexical tokens;
        generate a template document that includes:
            the respective portion of the first HTML instructions represented by the first portion of the first set of first lexical tokens;
            a first placeholder that indicates a first location in the template document corresponding to the third portion of the first set of first lexical tokens; and
            a second placeholder that indicates a second location in the template document corresponding to the fourth portion of the second set of second lexical tokens;
        generate a first view model for the first webpage, wherein the first view model includes a first indication of the template document, an indication of the first placeholder, and a first value for the first placeholder based on the respective portion of the first HTML instructions represented by the third portion of the first set of first lexical tokens; and
        generate a second view model for the second webpage, wherein the second view model includes a second indication of the template document, an indication of the second placeholder, and a second value for the second placeholder based on the respective portion of the second HTML instructions represented by the fourth portion of the second set of second lexical tokens.

2. The system of claim 1, wherein a first subset of the first set of first lexical tokens is generated based on the first HTML instructions, the system further comprising computer-executable instructions to:
    determine a portion of the first webpage that includes one or more of: Javascript instructions, Cascading Style Sheet (CSS) instructions, Visual Basic instructions, or Extensible Style Sheet (XSL) instructions; and
    generate a second subset of the first set of first lexical tokens based on the one or more of the Javascript instructions, the CSS instructions, the Visual Basic instructions, or the XSL instructions.

3. The system of claim 1, further comprising computer-executable instructions to:
    receive a request to access the first webpage;
    determine that the first view model is associated with the first webpage;
    based on the indication of the template document in the first view model, access the template document;
    based on the indication of the first placeholder and the first value in the first view model, add the first value from the first view model to the template document at a location corresponding to the first placeholder; and
    generate the first webpage using the template document and the first value from the first view model.

4. A method comprising:
    accessing first instructions associated with a first document;

generating a first token that represents a first portion of the first instructions;
generating a second token that represents a second portion of the first instructions;
accessing second instructions associated with a second document;
generating a third token that represents a first portion of the second instructions;
determining, based on the first token and the third token, that the first portion of the first instructions matches the first portion of the second instructions;
determining, based on the second token, that the second portion of the first instructions differs from the second instructions;
generating a template that includes the first portion of the first instructions and a first placeholder at a first location that corresponds to the second portion of the first instructions; and
generating first model data for the first document, wherein the first model data associates the second portion of the first instructions with the first placeholder.

5. The method of claim 4, further comprising:
generating second model data for the second document, wherein the second model data one or more of: lacks an indication of the first placeholder, associates a null value with the first placeholder, or indicates a lack of a value associated with a first placeholder.

6. The method of claim 4, further comprising:
generating a fourth token that references a second portion of the second instructions, wherein the second portion of the first instructions and the second portion of the second instructions are associated with the first location; and
generating second model data for the second document, wherein the second model data associates the second portion of the second instructions with the first placeholder.

7. The method of claim 6, further comprising:
generating a user interface that associates the first model data and the second model data with the template and with an indication of a section of the first document associated with the template.

8. The method of claim 4, further comprising:
generating a fourth token that references a second portion of the second instructions;
determining, based on the fourth token, that the second portion of the second instructions differs from the first instructions;
including, in the template, a second placeholder at a second location that corresponds to the second portion of the second instructions, wherein the first model data one or more of: lacks an indication of the second placeholder or associates a null value with the second placeholder; and
generating second model data for the second document, wherein the second model data associates the second portion of the second instructions with the second placeholder and one or more of: lacks an indication of the first placeholder or associates a null value with the first placeholder.

9. The method of claim 4, wherein the first portion of the first instructions is associated with a first programming language and the second portion of the first instructions is associated with a second programming language.

10. The method of claim 9, further comprising:
determining, in the first portion of the first instructions, an indication of the second programming language at a location corresponding to the second portion of the first instructions; and
determining the second programming language based on the indication of the second programming language at the location.

11. The method of claim 4, further comprising generating the first document by:
based on the association of the second portion of the first instructions with the first placeholder, adding the second portion of the first instructions to the template at a location associated with the first placeholder.

12. The method of claim 4, wherein the first token references one or more locations in one or more of the first instructions or the first document, and generating the template includes determining, based on the first token and the first instructions, the first portion of the first instructions at the one or more locations.

13. A system comprising:
one or more memories storing computer-executable instructions; and
one or more hardware processors to execute the computer-executable instructions to:
access first instructions associated with a first document and second instructions associated with a second document;
determine that a first portion of the first instructions matches a first portion of the second instructions;
determine that a second portion of the first instructions differs from the second instructions;
generate a template that includes a first portion of the first instructions and a first placeholder at a first location that corresponds to the second portion of the first instructions;
generate first model data for the first document, wherein the first model data associates the second portion of the first instructions with the first placeholder; and
generate second model data for the second document, wherein the second model data one or more of: lacks an indication of the first placeholder, associates a null value with the first placeholder, indicates a lack of a value associated with the first placeholder, or associates a second portion of the second instructions with the first placeholder.

14. The system of claim 13, further comprising computer-executable instructions to:
generate a first set of tokens for the first document, the first set including a first token that represents the first portion of the first instructions and a second token that represents the second portion of the first instructions; and
generate a second set of tokens for the second document, the second set including a third token that represents the first portion of the second instructions;
wherein the computer-executable instructions to determine that the first portion of the first instructions matches the first portion of the second instructions include computer-executable instructions to compare the first set of tokens to the second set of tokens.

15. The system of claim 14, wherein the first token references a second location in one or more of the first instructions or the first document, and the computer-executable instructions to generate the template include computer-executable instructions to: determine, based on the first token and the first instructions, that the first portion of the first instructions is associated with the second location in the one or more of the first instructions or the first document.

16. The system of claim 14, wherein the first portion of the first instructions includes a first programming language, the system further comprising computer-executable instructions to:
   determine the first programming language based on the first portion of the first instructions; and
   include an indication of the first programming language in the first token.

17. The system of claim 14, wherein the first portion of the first instructions includes a first programming language and the second portion of the first instructions includes a second programming language, the system further comprising computer-executable instructions to:
   determine, in the first instructions, an indication of the second programming language at a second location corresponding to the second portion of the first instructions; and
   determine the second programming language based on the indication of the second programming language.

18. The system of claim 13, further comprising computer-executable instructions to:
   access user interface data that associates instructions with separation between sections of a user interface;
   generate a user interface that presents data indicative of the first portion of the first instructions in a first section of the user interface based on correspondence between the user interface data and the first portion of the first instructions; and
   include, in the first section, an indication of the template, an indication of the first model data, and an indication of the second model data.

19. The system of claim 18, further comprising computer-executable instructions to:
   determine correspondence between the user interface data and the second portion of the first instructions; and
   based on the correspondence between the user interface data and the second portion, include, in a second section of the user interface, an indication of the template and the first model data.

20. The system of claim 13, further comprising computer-executable instructions to:
   generate the first document by adding the second portion of the first instructions to the template at the first location of the first placeholder, based on the first model data.

* * * * *